US008808543B2

(12) United States Patent
Reid

(10) Patent No.: US 8,808,543 B2
(45) Date of Patent: Aug. 19, 2014

(54) METHOD FOR WET WEATHER WASTEWATER TREATMENT

(76) Inventor: John H. Reid, Fredericksburg, VA (US)

( * ) Notice: Subject to any disclaimer, the term of this patent is extended or adjusted under 35 U.S.C. 154(b) by 377 days.

(21) Appl. No.: 13/174,673

(22) Filed: Jun. 30, 2011

(65) Prior Publication Data

US 2013/0001159 A1    Jan. 3, 2013

(51) Int. Cl.
*C02F 3/30* (2006.01)
*C02F 103/00* (2006.01)
*C02F 3/12* (2006.01)

(52) U.S. Cl.
CPC ............... *C02F 3/30* (2013.01); *C02F 2303/24* (2013.01); *C02F 2303/02* (2013.01); *C02F 2103/001* (2013.01); *C02F 3/1263* (2013.01); *C02F 3/1268* (2013.01)
USPC ............................ 210/605; 210/623; 210/630

(58) Field of Classification Search
CPC ............. C02F 2103/001; C02F 3/1263; C02F 3/1268; C02F 2303/02; C02F 2303/24
USPC .................... 210/605, 620, 623, 630
See application file for complete search history.

(56) References Cited

U.S. PATENT DOCUMENTS

| | | | |
|---|---|---|---|
| 4,277,341 A | 7/1981 | Wise et al. | |
| 4,663,044 A | 5/1987 | Goronszy | |
| 4,824,563 A | 4/1989 | Iwahori et al. | |
| 4,867,883 A | 9/1989 | Daigger et al. | |
| 4,917,805 A | 4/1990 | Reid | |
| 5,266,200 A | 11/1993 | Reid | |
| 5,288,405 A | 2/1994 | Lamb, III | |
| 5,342,522 A | 8/1994 | Marsman et al. | |
| 5,380,438 A | 1/1995 | Nungesser | |
| 5,401,412 A | 3/1995 | Yang et al. | |
| 5,447,633 A | 9/1995 | Matsche et al. | |
| 5,480,548 A | 1/1996 | Daigger et al. | |
| 5,545,325 A | 8/1996 | Hsu et al. | |
| 5,603,833 A | 2/1997 | Miller | |
| 5,611,927 A | 3/1997 | Schmid | |
| 5,667,688 A | 9/1997 | Kerrn-Jespersen et al. | |
| 5,733,456 A | 3/1998 | Okey et al. | |
| 5,792,355 A | 8/1998 | Desjardins | |
| 5,833,856 A | 11/1998 | Liu et al. | |
| 5,853,589 A | 12/1998 | Desjardins et al. | |
| 5,888,394 A | 3/1999 | Jan | |
| 6,136,185 A | 10/2000 | Sheaffer | |
| 6,312,599 B1 | 11/2001 | Reid | |
| 7,638,065 B2 * | 12/2009 | Stever et al. ............... | 210/747.3 |
| 2002/0096472 A1 * | 7/2002 | Smith et al. .................. | 210/606 |
| 2010/0072131 A1 * | 3/2010 | Nick et al. .................... | 210/605 |

OTHER PUBLICATIONS

Brochure of Fluidyne Corporation, "ISAM^ TM Sequencing Batch Reactor Process", 8 pages.

* cited by examiner

*Primary Examiner* — Fred Prince
(74) *Attorney, Agent, or Firm* — Walter Ottesen P.A.

(57) ABSTRACT

Method for treating wastewater, in particular municipal wastewater, in which the wastewater is initially received in an equalization basin reactor for performing an infiltration and inflow equalization process. The equalization basin reactor has sufficient capacity for the increased inflow of wastewater received under wet weather conditions. However, the increased inflow is not merely stored in the equalization basin reactor for later processing, but the wastewater treatment process continues throughout the wet weather period with the first stage wastewater treatment being performed in the equalization basin reactor, which further provides a substantially constant outflow of partially treated wastewater for subsequent treatment stages.

25 Claims, 5 Drawing Sheets

METHOD FOR WET WEATHER WASTEWATER TREATMENT

FIELD OF THE DISCLOSURE

A method for treating wastewater in a sewage treatment plant that provides for an equalization of intake flow volumes and rates under dry weather and wet weather conditions. Further, the instant method provides for continuous wastewater treatment under wet weather conditions.

BACKGROUND

Sewage treatment plants, in particular treatment plants for municipal wastewater, receive wastewater at variable flow rates and volumes that can typically be represented by a diurnal flow curve. However, under wet weather conditions, such as a severe rainstorm, wastewater intake rate and volume increase significantly due to the mixing of stormwater with wastewater. Moreover, the concentration of pollutants and the amount of dissolved oxygen of the wastewater change considerably. In particular, sewage treatment plants having groundwater infiltration and surface stormwater inflow problems experience a significant increase in sewage flow rate and volume.

If a wastewater treatment system cannot process the increased intake flow rate or volume, these very high peak wet weather inflow rates can cause solids and other pollutant breakthroughs in the sewage treatment plant due to excessively reduced hydraulic detention times in the biological treatment process reactors, and increased hydraulic and solids loading rates on the biological treatment process final clarifier.

Common practice in municipal sewage treatment plants is to switch to a "process protection" mode during wet weather inflow conditions by shutting off the mixing and/or aeration equipment in the biological treatment process reactors to allow activated sludge solids to settle out in the reactors so these activated sludge solids will not be washed into and out of the final clarifiers during peak wet weather flow rate conditions. Attempting to maintain total nitrogen and total phosphorus removal efficiency during wet weather events typically becomes very difficult for municipal sewage treatment plants with wet weather inflow problems.

It is known to use equalization basins (EQs) to store wet weather sewage influent flow surges and reduce peak throughput sewage flow rates. These EQs are commonly provided upstream of biological treatment process reactors to reduce the negative impact of variable wastewater inflow rates and pollutant loading rates; equalization basins are used to store, blend and equalize variable wastewater influent flows and loads upstream of the BNR treatment process units. Storing raw wastewater and stormwater inflow in an equalization basin (FEB) can produce odors unless the FEB is operated with aeration to transfer oxygen into the wastewater in order to maintain aerobic conditions and prevent odorous septic conditions. Aeration of the FEB, however, results in the reduction of carbon source in the raw wastewater which is needed in the downstream BNR process for nitrate-nitrogen removal by biological denitrification.

Typically, sewage treatment plants remove pollutants from the wastewater by using a series of bioreactors that are each run at different treatment conditions, i.e., aerobic treatment, anaerobic treatment, anoxic treatment, and anaerobic fermentation treatment conditions.

For example, a sewage treatment plant may treat wastewater containing biological oxygen demand (BOD) by first converting wastewater to mixed liquor while controlling dissolved oxygen (D.O.) levels. Further, the multiple biological treatments comprise deamination of proteins to form ammonia, hydrolysis of adenosine triphosphate (ATP) to form adenosine diphosphate (ADP) while releasing phosphate ions and energy and ingesting volatile fatty acids (VFAs) by polyP bacteria, and denitrification of recycled nitrates and nitrites. A detailed description of multiple biological treatments is found in U.S. Pat. No. 6,312,599 to Reid, which is herein incorporated by reference in its entirety.

SUMMARY OF THE DISCLOSURE

Disclosed herein is a method of treating wastewater, which provides the design capability to avoid wet weather operations and performance problems, and, in particular, to avoid protection mode operation. This goal is achieved by providing an equalization basin reactor for achieving equalization of the outflow from the equalization basin reactor, while being capable of handling wet weather inflow rates and volumes, while simultaneously achieving first, second, and third stage wastewater treatment. For example, the first stage of wastewater treatment may be an activated sludge treatment with significant removal of BOD and removal of nitrogen from nitrates. The equalization basin reactor is also referred to herein as a Storm Surge Flow Equalization (EQ) Reactor, which is located at the head and as part of the activated sludge biological treatment process.

Specifically, in a preferred embodiment of the instantly disclosed method for treating wastewater, wastewater is received in at least one equalization basin reactor in which a first wastewater treatment is performed to obtain partially treated wastewater. The partially treated wastewater is fed as an outflow stream from the at least one equalization basin reactor into at least one bioreactor, in which a second wastewater treatment is performed to obtain substantially treated wastewater. Subsequently, an outflow of the substantially treated wastewater is fed from the at least one bioreactor into a gravity settling clarifier or a floatation clarifier, in which an activated sludge is precipitated, thereby obtaining treated water from the substantially treated wastewater. The treated water is discharged at a discharge point. Further, the at least one equalization basin reactor has an inflow surge volume capacity of about 30% to about 300% of an average daily flow volume.

In another preferred embodiment, a plurality of wastewater treatment plant trains is provided, wherein each train from among the plurality of treatment plant trains comprises at least one equalization basin reactor, at least one bioreactor, and a clarifier. Further, wastewater is received in at least one equalization basin reactor in which a first wastewater treatment is performed to obtain partially treated wastewater. The partially treated wastewater is fed as an outflow stream from the at least one equalization basin reactor into at least one bioreactor, in which a second wastewater treatment is performed to obtain substantially treated wastewater. Subsequently, an outflow of the substantially treated wastewater is fed from the at least one bioreactor into a clarifier, in which an activated sludge is precipitated, thereby obtaining treated water from the substantially treated wastewater. The treated water is discharged at a discharge point. Moreover, the at least one equalization basin reactor has an inflow surge volume capacity of about 30% to about 300% of an average daily flow volume.

DESCRIPTION OF THE BEST AND VARIOUS EMBODIMENTS

Figure 1:
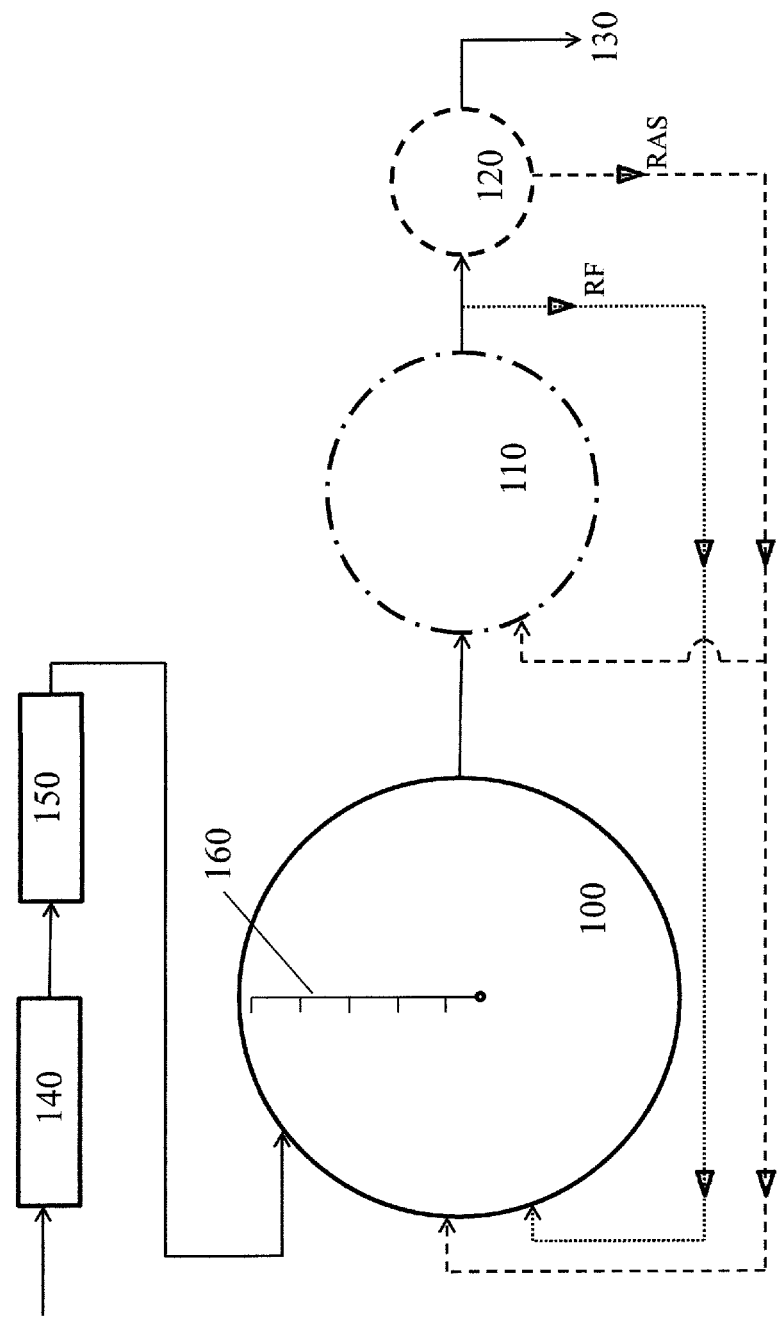
FIG. 1 shows a wastewater treatment plant having an equalization basin reactor 100, a bioreactor 110, and a clarifier 120.

The foregoing and other objects, aspects, and advantages will be better understood from the following detailed description of the best and various embodiments. Throughout the various views and illustrative embodiments of the present disclosure, like reference numbers are used to designate like elements.

In a preferred embodiment, the inflow surge volume capacity is preferably about 30% to about 300%, more preferably about 50% to about 200% of the average daily flow volume, and even more preferably about 75% to about 100% of the average daily flow volume.

The instant method allows for continuing a wastewater treatment under wet weather conditions while removing pollutants to the extent required by applicable regulations and to the extent achieved under dry weather conditions. As used herein, dry weather conditions refer to the conditions found at wastewater treatment plants wherein the wastewater received at the intake of the plant has its origins in buildings connected to the sewage system. However, during dry weather conditions a portion of the wastewater may also stem from groundwater or surface water flowing into the sewage system. Dry weather conditions are characterized by having a diurnal flow pattern with two distinct peaks that typically occur in the morning and early evening.

Wet weather conditions refer to the conditions found at sewage treatment plants wherein the intake of the wastewater plant increases significantly due to the addition of stormwater to the wastewater received during dry weather conditions. The source of stormwater is typically rain water entering the sewage system through storm drains. However, as used herein, stormwater describes an increase in intake flow rate and volume at the sewage plant in excess of the amounts received during dry weather conditions. Thus, the term stormwater is not limited to rainfall from a storm, but may, for example, also refer to water entering the sewage system as a result of melting snow or the breach of a levy.

Typically, the wastewater is municipal wastewater, industrial wastewater, or a mixture thereof. In a preferred embodiment, the wastewater is municipal wastewater. Thus, with preference, a preferred sewage treatment plant is a municipal wastewater treatment plant. However, wastewater treatment plants for industrial wastewater sources where stormwater may additionally contribute to the total intake flow and rate are also within the scope of the instant disclosure.

In a preferred embodiment, the outflow of the partially treated wastewater is substantially constant over time. Typically, under dry weather conditions, the wastewater treatment plant receives wastewater at a dry weather peak hourly flow rate of about 2.5 to 3.0 times of an average daily flow rate. Under wet weather conditions, wastewater is received at a wet weather peak hourly flow rate of about 4 times to about 5 times of an average daily flow rate.

In another preferred embodiment, the performing of the first wastewater treatment is selected from the group consisting of aerobic treatment, anaerobic treatment, anoxic treatment, and anaerobic fermentation. In yet another preferred embodiment, the performing of the second wastewater treatment is selected from the group consisting of aerobic treatment, anaerobic treatment, anoxic treatment, and anaerobic fermentation. With particularity, the second wastewater treatment is aerobic treatment or anoxic treatment.

The first wastewater treatment may be performed in one stage when one equalization basin reactor is used, or in several stages when a plurality of equalization basin reactors is used. The first wastewater treatment provides partially treated wastewater.

In yet another preferred embodiment, two or more equalization basin reactors are connected in series, i.e., the outflow of one equalization basin reactor is directed to the intake of another equalization basin reactor. Further, in each of the two or more equalization basin reactors the first wastewater treatment is performed and is independently selected in each of the two or more equalization basin reactors from the group consisting of aerobic treatment, anaerobic treatment, anoxic treatment, and anaerobic fermentation.

In yet another preferred embodiment, two or more equalization basin reactors are connected in parallel, i.e., each equalization basin reactor is an intake for wastewater. Further, in each of the two or more equalization basin reactors the first wastewater treatment is performed and is independently selected in each of the two or more equalization basin reactors from the group consisting of aerobic treatment, anaerobic treatment, anoxic treatment, and anaerobic fermentation. The outflow of an equalization basin reactor from among the two or more equalization reactors may be directed to another equalization reactor or to a bioreactor.

In another preferred embodiment, two or more bioreactors are connected in series, i.e., the outflow of one bioreactor is directed to the intake of another bioreactor. Further, in each of the two or more bioreactors the second wastewater treatment is performed and is independently selected in each of the two or more bioreactors from the group consisting of aerobic treatment, anaerobic treatment, anoxic treatment, and anaerobic fermentation. Preferably, the second wastewater treatment is independently selected in each of the two or more bioreactors from the group consisting of aerobic treatment and anoxic treatment. The second wastewater treatment provides substantially treated wastewater.

In yet another preferred embodiment, two or more bioreactors are connected in parallel, i.e., each bioreactor is an intake for partially treated wastewater. Further, in each of the two or more bioreactors the second wastewater treatment is performed and is independently selected in each of the two or more bioreactors from the group consisting of aerobic treatment, anaerobic treatment, anoxic treatment, and anaerobic fermentation, preferably aerobic treatment or anoxic treatment. The outflow of a bioreactor from among the two or more bioreactors may be directed to another bioreactor or to a clarifier.

Typically, the wastewater is agitated in the at least one equalization basin reactor with a floating mixer and/or with a jet manifold mixing system and/or with a submersible mixer pump. Also typically, the outflow of the substantially treated wastewater is partially returned from a bioreactor into at least one equalization basin reactor.

In a preferred embodiment of equalization basin reactors connected in series, the outflow of a downstream equalization basin reactor from among the two or more equalization basin reactors is partially returned to an upstream equalization basin reactor.

In another preferred embodiment of bioreactors being connected in series, the outflow of a downstream bioreactor from among the two or more bioreactors is partially returned to an upstream bioreactor and/or to the at least one equalization basin reactor.

In yet another preferred embodiment, activated sludge that precipitated in the clarifier is partially returned to the at least one equalization basin reactor and/or the at least one bioreactor.

In another preferred embodiment, a screening and/or a grit removal is performed prior to the receiving the wastewater in the at least one equalization basin reactor.

Further, in a preferred embodiment of a wastewater treatment plant having a plurality of wastewater treatment plant trains, the outflow of the bioreactor of a first train from among the plurality of wastewater treatment plant trains is partially returned to the equalization basin reactor of the first train or of a second train. In yet another preferred embodiment, activated sludge precipitated in a gravity settling clarifier or a flotation clarifier is partially returned into the at least one equalization basin reactor of the first train or of a second train and/or to the at least one bioreactor of the first train or of the second train.

FIG. 1 shows a schematic flow of wastewater through a wastewater treatment plant. Optionally, incoming wastewater is screened for large debris in screening unit 140 and grit is removed in grit removal unit 150. Thereafter, wastewater is provided to the intake side of equalization basin reactor 100. The outflow of equalization basin reactor 100, which is substantially constant over time, is directed to the intake of bioreactor 110. Subsequently, the outflow of bioreactor 110 is conducted to clarifier 120. Finally, the outflow of gravity settling clarifier or floatation clarifier 120 is discharged at discharge point 130. Typically, discharge point 130 is located at a river, a canal, a lake, a bay, or an ocean. Equalization basin reactor 100 contains a floating mixer or a jet manifold system or a submersible pump mixer 160 to agitate the wastewater within equalization basin reactor 100.

Further, FIG. 1 shows the mixed liquor Recycle Flow (RF) from bioreactor 110 to equalization basin reactor 100 in which a portion of the outflow of bioreactor is returned to the upstream equalization basin reactor instead of being further processed in the clarifier 120. The schematic path of RF is indicated by a dotted line. Additionally, activated sludge precipitated in gravity settling clarifier or floatation clarifier 120 may be returned as Return Activated Sludge (RAS) from the clarifier 120 to bioreactor 110 and/or equalization basin reactor 100. The schematic path of RAS is indicated by a dashed line.

Figure 2:
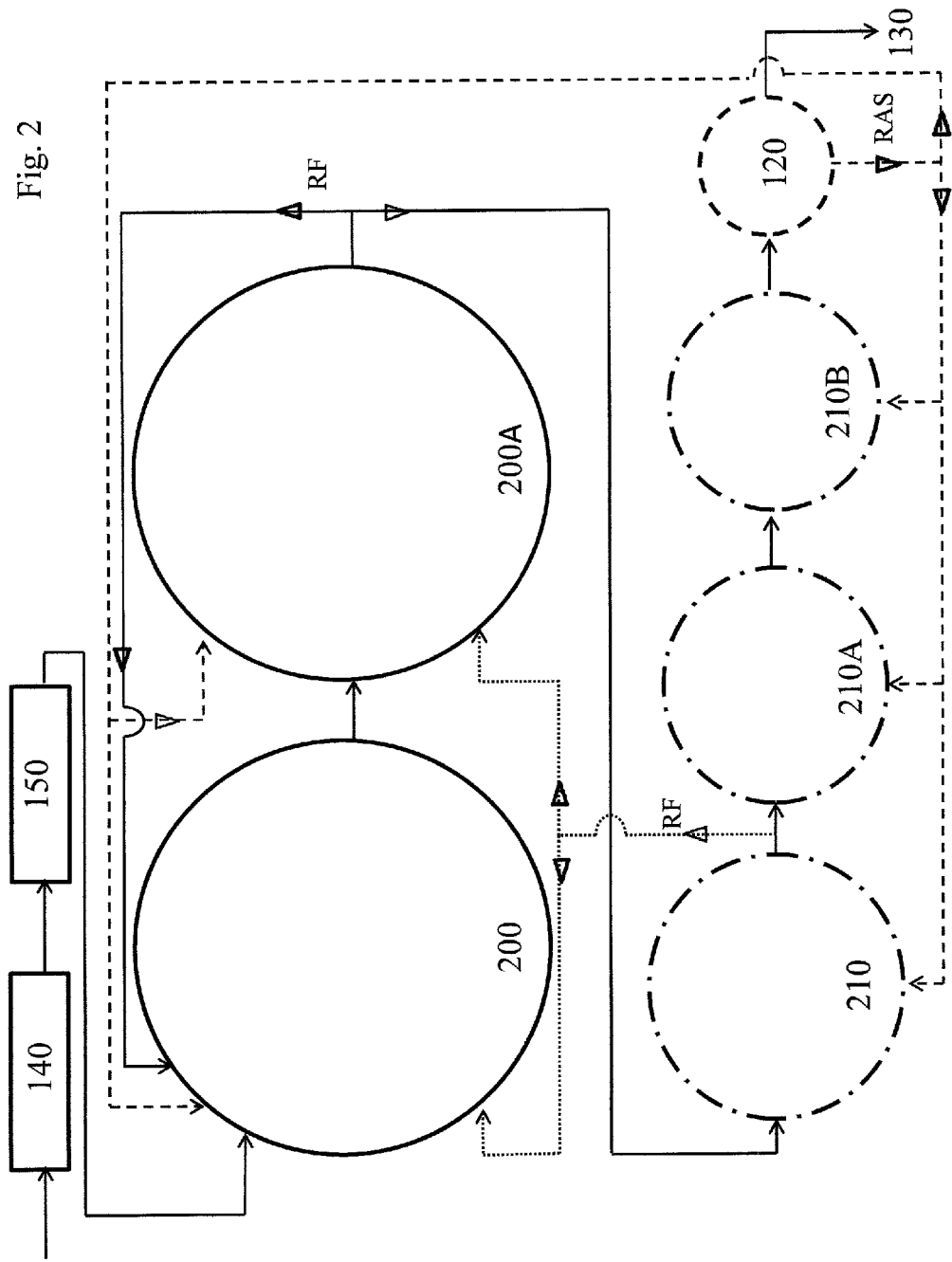
FIG. 2 shows a wastewater treatment plant having two equalization basin reactors 200 and 200A, three bioreactors 210, 210A, and 210B, and clarifier 120.

FIG. 2 shows a wastewater treatment plant having two equalization basin reactors 200 and 200A, three bioreactors 210, 210A, and 210B, and gravity settling clarifier or flotation clarifier 120. Equalization basin reactors, bioreactors, and clarifier are connected in series, such that the outflow of one treatment stage is connected to the intake of the next treatment stage.

FIG. 2 further shows the RF path from bioreactor 210 to equalization basin reactors 200 and 200A. A RF path (dotted line) may be provided to either one or to both of equalization basin reactors 200 and 200A. Additionally, activated sludge can be returned as RAS from clarifier 120 to bioreactor 210 and or 210A and/or 210B, preferably to bioreactor 210 and/or 210A. The schematic path of RAS is indicated by a dashed line.

Figure 3:
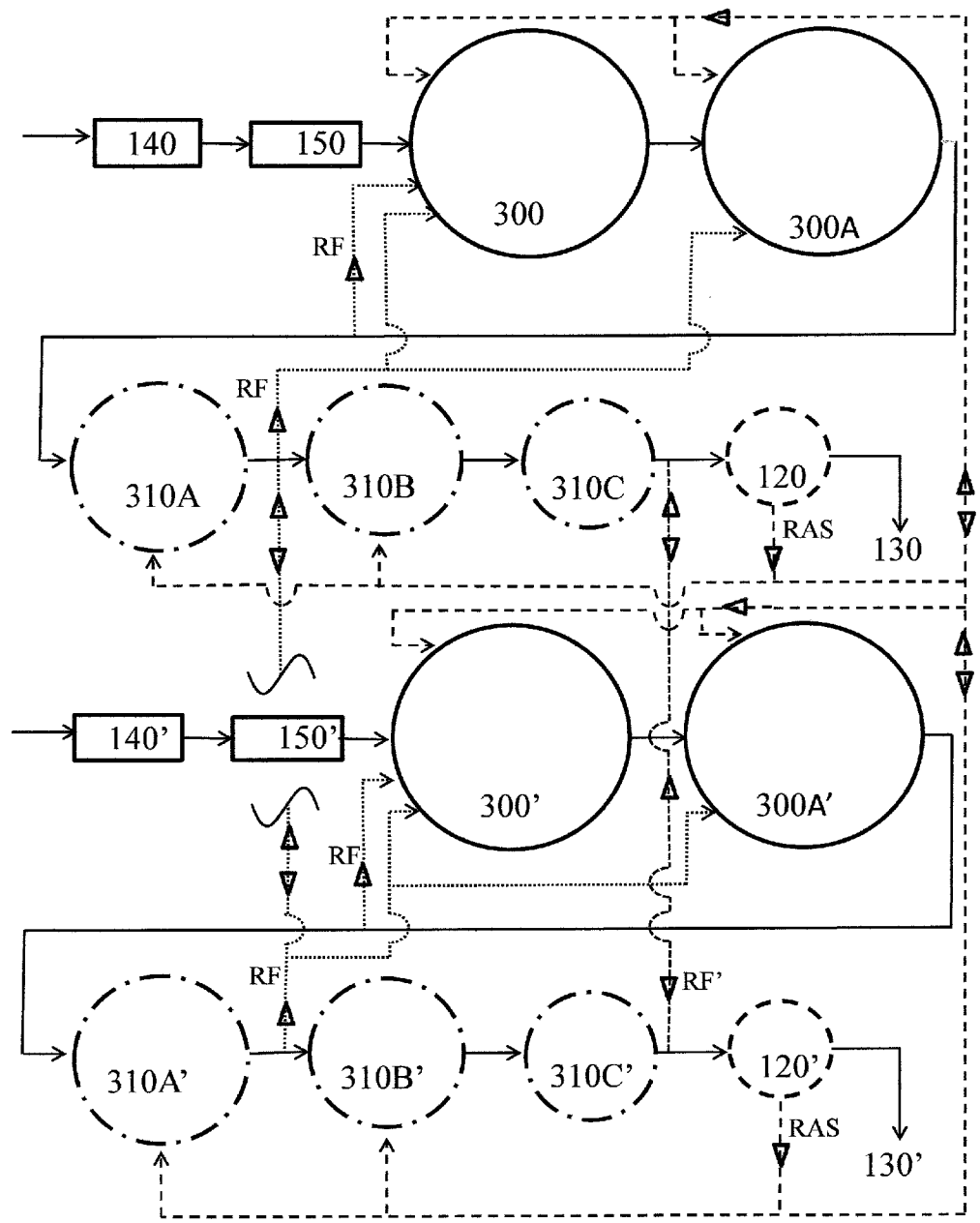
FIG. 3 shows a wastewater treatment plant having two trains of wastewater treatment plant trains, a first train having equalization basin reactors 300 and 300A, three bioreactors 310A, 310B, and 310C, and clarifier 120, and a second train having equalization basin reactors 300' and 300A', three bioreactors 310A', 310B', and 310C', clarifier 120'. Further, the outflow of gravity settling clarifier or floatation clarifier 120' is discharged at discharge point 130'.

FIG. 3 shows a wastewater treatment plant having two trains of wastewater treatment plant trains, a first train having equalization basin reactors 300 and 300A, three bioreactors 310A, 310B, and 310C, and clarifier 120, and a second train having screening unit 140', grit removal unit 150', equalization basin reactors 300' and 300A', three bioreactors 310A', 310B', and 310C', and clarifier 120'. Within each train, partially treated wastewater, substantially treated wastewater, or activated sludge may be partially returned to an upstream treatment stage. As an example, FIG. 3 depicts the partial return of substantially treated wastewater from bioreactor 310A to equalization basin reactor 300 and 300A, as well as from bioreactor 310A to equalization basin reactor 300' and 300A'. Thus, substantially treated wastewater may be returned to an equalization basin reactor within the same wastewater treatment plant train or to an equalization basin reactor of another wastewater treatment plant train.

Further, FIG. 3 depicts a path labeled RF' for connecting the two trains downstream of bioreactor 310C or 310C'. This path allows for pumping of the outflow of bioreactor 310C to bioreactor 310C' in addition to providing a path for connecting the outflow of bioreactor 310C to clarifier 120' or of the outflow of bioreactor 310C' to clarifier 120. For clarity, other possible return paths are omitted.

Figure 4:
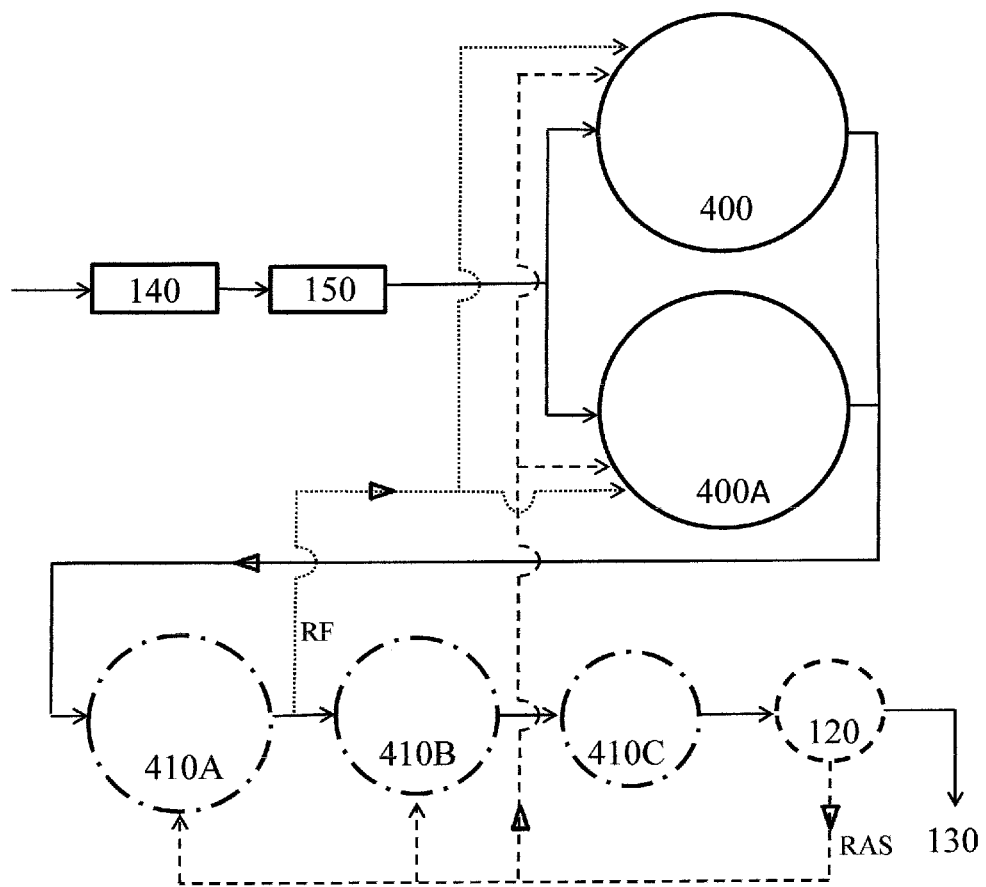
FIG. 4 shows a wastewater treatment plant having two equalization basin reactors 400 and 400A, three bioreactors 410A, 410B, and 410C, and clarifier 120.

FIG. 4 shows a wastewater treatment plant having two equalization basin reactors 400 and 400A, three bioreactors 410A, 410B, and 410C, and clarifier 120. In this embodiment, equalization basin reactors 400 and 400A are connected in parallel such that each reactor receives incoming wastewater at an intake. Further, both equalization basin reactors 400 and 400A provides equalization of wastewater intake as well as a first wastewater treatment. The first wastewater treatment performed in equalization basin reactors 400 may be the same as the first wastewater treatment performed in equalization basin reactors 400A. Preferably, however, different first wastewater treatments are performed in equalization basin reactors 400 and 400A.

FIG. 4 further shows the RF path from bioreactor 410A to equalization basin reactors 400 and 400A, wherein a RF path (dotted line) may be provided to either one or to both of equalization basin reactors 400 and 400A. Additionally, activated sludge can be returned as RAS (dashed line) from clarifier 120 to bioreactor 410A and/or 410B.

Figure 5A:
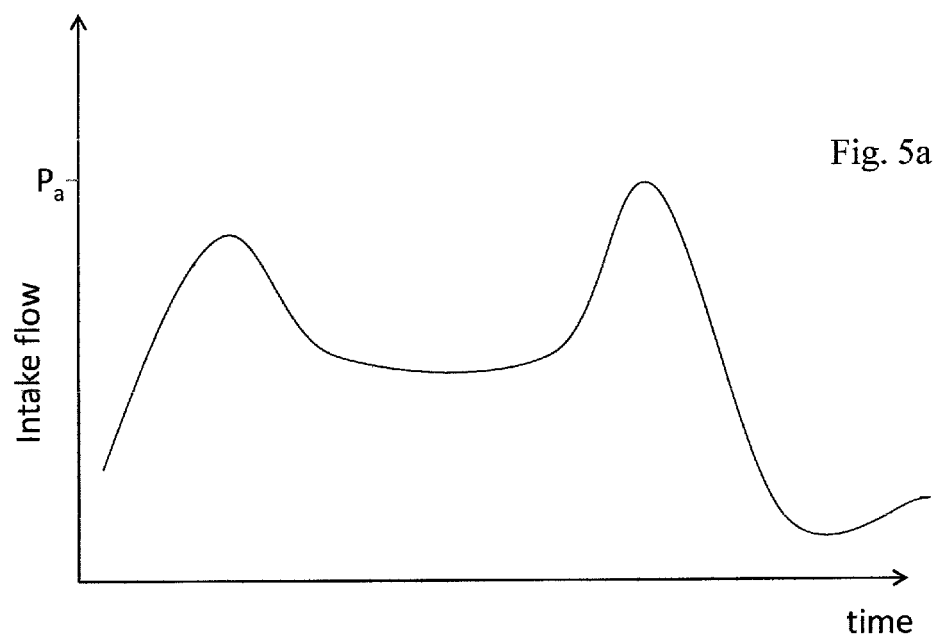
FIG. 5a shows a diurnal flow curve depicting the intake flow rate of a sewage treatment plant under dry weather conditions.

FIG. 5a shows a diurnal flow curve depicting the intake flow rate of a sewage treatment plant under dry weather conditions typical for an intake flow rate measured at the head of a wastewater treatment plant. A characteristic feature is that the flow curve shows two peaks over a period of 24 hours. In between two peaks, periods of lower intake flow rates are observed. Further, one or both of the peaks have a dry weather peak hourly flow rate $P_a$ of about 2.5 to 3.0 times of an average daily flow rate.

Figure 5B:
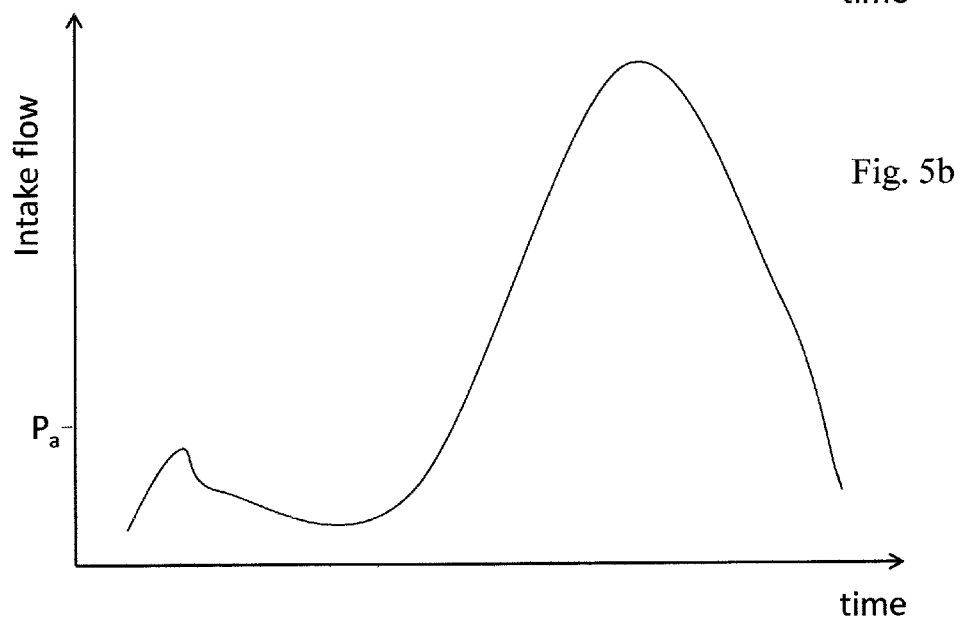
FIG. 5b shows the intake flow rate of a sewage treatment plant under wet weather conditions.

In FIG. 5b the intake flow rate of a sewage treatment plant under wet weather conditions is depicted. Typically, during wet weather conditions, wastewater is received at a wet weather peak hourly flow rate of about 4 times to about 5 times of an average daily flow rate or up to twice the dry weather peak hourly flow rate $P_a$.

The total equalization basin reactor volume provided in a sewage treatment plant can be determined by the predicted design seasonal wet weather influent flow rates and volumes;

the maximum desired treatment system flow-through rate; the influent sewage pollutant concentrations and loadings; and, the required reactor process pollutant removal efficiency.

For example, a sewage treatment plant with a design average daily flow volume (ADF) of 1.7 millions of gallons per day (MGD) can be expected to have a peak hourly dry weather flow rate of approximately 2.5 times the ADF=4.3 MGD. Under wet weather infiltration and inflow conditions, the wastewater treatment system daily flow volumes can, for example, increase to 3.5 MGD and the peak hourly flow rate could climb up 4.0 to 5.0 times the ADF=6.8 MGD to 8.5 MGD. Similarly, a 4.6 MGD ADF design capacity sewage treatment plant can expect a design peak hourly flow rate of 11.5 MGD under dry weather conditions but this flow rate can jump to 22.5 MGD under wet weather conditions.

The equalization basin reactor has preferably an inflow surge volume capacity of about 30% to about 300% of an average daily flow volume, more preferably of about 50% to about 200% of an average daily flow volume, and even more preferably of about 75% to about 100% of an average daily flow volume. The total equalization basin reactor volume can be provided in one tank or be divided into multiple equalization basin reactors. Further, the number of treatment plant trains such as single train, dual train, three or multiple trains corresponds to the minimum number of equalization basin reactors within the wastewater treatment plant.

To reduce the impact and cost of stormwater inflow from wet weather, repairs have to be made to old sewage collection systems and/or sewage treatment plants have to be designed for much larger flow rates and corresponding less efficient treatment process operation unless adequate flow equalization is provided at the sewage treatment plant upstream of the treatment process biological reactors, clarifiers, filters, disinfection system, etc. The equalization basins must provide adequate flow surge storage volume to cut or significantly reduce the peak inflow rate that must be processed through the downstream sewage treatment plant unit processes. By reducing the peak flow that must be treated through the sewage treatment plant through the use of equalization basin reactors, the maximum design capacity and capital cost of the unit processes of the sewage treatment plant can be reduced.

Disclosed herein is a system in which the equalization basin reactor not only provides a wet weather surge storage volume, but also performs a first biological treatment process, i.e., also provides a reactor volume and not merely storage volume. The instant method may, therefore, also be viewed as an Infiltration and Inflow (I&I) equalization basin reactor process. The equalization basin reactor process provides a flow surge volume that is simultaneously included into the sewage treatment plant design, for example as a combined first stage anaerobic reactor and a second stage anoxic reactor. Specifically, a first wastewater treatment is performed in two stages wherein each stage is performed in one equalization basin reactor, i.e., a reactor operating under variable intake and fill level conditions and substantially constant outflow.

Alternatively, the equalization basin reactor may be a first stage anoxic reactor, followed by a two, three, or more staged biological activated sludge treatment process typically designed and operated to provide enhanced biological phosphorus and/or nitrogen removal. Thus, the second wastewater treatment may be performed in one stage or in a plurality of stages, with each stage being performed in one bioreactor, i.e., a reactor operating under substantially constant intake and outflow.

Equalization basin reactors may also be designed as aerobic equalization basin reactors in a single or multi stage activated sludge treatment system; or, as anaerobic, anoxic or aerobic equalization basin reactors upstream of conventional Sequencing Batch Reactor (SBR) Systems or Membrane Bioreactor (MBR) Systems.

The operation and the efficiency of biological nutrient removal (BNR) systems are affected by variable daily wastewater inflow rates and volumes, and by pollutant loading rates. These variable wastewater influent flow rates and volumes, and, pollutant loading rates make BNR system design and operation more difficult, usually requiring automatic control and pacing of pumping equipment, aeration equipment and chemical feed equipment according to wastewater flow rate and other process control parameters. Wide swings in sewage inflow rates and pollutant loading, in particular during a wet weather event, impact the design and performance of BNR process reactors, clarifiers, pumps, and other equipment.

In order to provide the required flow equalization volume to achieve stormwater inflow equalization at municipal wastewater treatment plants without aeration and the resulting wastewater carbon source consumption, FEB Reactors can be used to provide combined wastewater flow storage and anaerobic, anoxic or aerobic activated sludge treatment.

Similarly, in order to provide the required stormwater inflow equalization at industrial wastewater treatment plants without aeration and carbon source consumption, FEB Reactors can be used to provide combined wastewater flow storage and anaerobic, anoxic or aerobic activated sludge treatment.

The following examples are preferred embodiments of the disclosure, which are particularly suitable for the treatment of wastewater.

Example 1

Three equalization basin reactors are connected in series, in which the first reactor is a fermentation equalization basin reactor, the second reactor is an anaerobic equalization basin reactor, and the third reactor is an anoxic equalization basin reactor. The outflow from the third equalization basin reactor is provided to the intake of a bioreactor. A RF path is provided from the third to the second reactor. Further, example 1 comprises a RF path and a RAS path from the bioreactor and the clarifier, respectively, to the second and third equalization basin reactors.

Example 2

Two equalization basin reactors are connected in series, in which the first reactor is a fermentation equalization basin reactor and the second reactor is an anaerobic equalization basin reactor. The outflow from the second equalization basin reactor is provided to the intake of a bioreactor. Further, example 2 comprises a RF path and a RAS path from the bioreactor and the clarifier, respectively, to the second equalization basin reactor.

Example 3

The first wastewater treatment is performed in one stage in an equalization basin reactor, which is a fermentation equalization basin reactor. The outflow from the equalization basin reactor is provided to the intake of a bioreactor.

Example 4

Three equalization basin reactors are connected in series, in which the first reactor is an anaerobic equalization basin reactor, the second reactor is an anoxic equalization basin reactor, and the third reactor is an aerobic equalization basin reactor. The outflow from the third equalization basin reactor is provided to the intake of a bioreactor. A RF path is provided from the third to the second equalization basin reactor as well as from the second to the first equalization basin reactor. Further, example 4 comprises a RAS path from the clarifier to the second and third equalization basin reactors.

Example 5

The first wastewater treatment is performed in one stage in an equalization basin reactor, which is an anoxic equalization basin reactor. The outflow from the equalization basin reactor is provided to the intake of a bioreactor. RF and RAS paths may be further provided.

Example 6

Two equalization basin reactors are connected in series, in which the first reactor is an anoxic equalization basin reactor and the second reactor is an aerobic equalization basin reactor. The outflow from the second equalization basin reactor is provided to the intake of a bioreactor. Further, example 2 comprises a RF path and a RAS path from the bioreactor and the clarifier, respectively, to the second equalization basin reactor. A RF path from the second to the first equalization basin reactor is provided, as is a RAS path from the clarifier to the first and second equalization basin reactors.

The embodiments described hereinabove are further intended to explain best modes known of practicing the disclosure and to enable others skilled in the art to utilize the disclosure in such, or other, embodiments and with the various modifications required by the particular applications or uses. Accordingly, the description is not intended to limit the disclosure to the form disclosed herein. Also, it is intended that the appended claims be construed to include alternative embodiments.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

What is claimed is:

1. A method for treating wastewater comprising:
performing a mechanical screening of wastewater in a mechanical wastewater treatment unit;
receiving the wastewater directly from the mechanical wastewater treatment unit in at least one equalization basin reactor under dry weather conditions with a dry weather peak hourly flow rate and under wet weather conditions with a wet weather peak hourly flow rate;
performing a first wastewater treatment in the at least one equalization basin reactor under the dry weather conditions and under the wet weather conditions to obtain partially treated wastewater;
feeding an outflow of the partially treated wastewater from the at least one equalization basin reactor into at least one bioreactor;
performing a second wastewater treatment in the at least one bioreactor to obtain substantially treated wastewater;
feeding an outflow of the substantially treated wastewater from the at least one bioreactor into a gravity settling clarifier or a floatation clarifier;
precipitating an activated sludge in the clarifier from the substantially treated wastewater to obtain treated water; and
discharging the treated water at a discharge point,
wherein the at least one equalization basin reactor has an inflow surge volume capacity of about 30% to about 300% of an average daily flow volume; and,
wherein a portion of the wastewater received in the at least one equalization basin reactor under wet weather conditions comprises stormwater from infiltration and inflow into an upstream municipal sewer system.

2. The method according to claim 1, wherein the inflow surge volume capacity is about 50% to about 200% of the average daily flow volume.

3. The method according to claim 1, wherein the inflow surge volume capacity is about 75% to about 100% of the average daily flow volume.

4. The method according to claim 1, wherein the wastewater is municipal wastewater, industrial wastewater, or a mixture thereof.

5. The method according to claim 4, wherein the wastewater is municipal wastewater.

6. The method according to claim 1, wherein the outflow of the partially treated wastewater is substantially constant over time.

7. The method according to claim 1, further comprising receiving the wastewater at the dry weather peak hourly flow rate of about 2.5 to about 3.0 times of an average daily flow rate.

8. The method according to claim 1, further comprising receiving the wastewater at the wet weather peak hourly flow rate of about 4 times to about 5 times of an average daily flow rate.

9. The method according to claim 1, wherein the performing of the first wastewater treatment is selected from the group consisting of aerobic treatment, anaerobic treatment, anoxic treatment, and anaerobic fermentation.

10. The method according to claim 1, wherein the performing of the second wastewater treatment is selected from the group consisting of aerobic treatment, anaerobic treatment, anoxic treatment, and anaerobic fermentation.

11. The method according to claim 10, wherein the performing of the second wastewater treatment is selected from the group consisting of aerobic treatment and anoxic treatment.

12. The method according to claim 1, further comprising:
connecting two or more equalization basin reactors in series; and
performing the first wastewater treatment in each of the two or more equalization basin reactors;
wherein the performing the first wastewater treatment is independently selected in each of the two or more equalization basin reactors from the group consisting of aerobic treatment, anaerobic treatment, anoxic treatment, and anaerobic fermentation.

13. The method according to claim 12, further comprising: partially returning the outflow of a downstream equalization basin reactor from among the two or more equalization basin reactors to the at least one equalization basin reactor.

14. The method according to claim 1, further comprising: connecting two or more equalization basin reactors in parallel; and
performing the first wastewater treatment in each of the two or more equalization basin reactors;
wherein the performing the first wastewater treatment is independently selected in each of the two or more equalization basin reactors from the group consisting of aerobic treatment, anaerobic treatment, anoxic treatment, and anaerobic fermentation.

15. The method according to claim 1, further comprising: connecting two or more bioreactors in series; and
performing the second wastewater treatment in each of the two or more bioreactors;
wherein the performing the second wastewater treatment is independently selected in each of the two or more bioreactors from the group consisting of aerobic treatment, anaerobic treatment, anoxic treatment, and anaerobic fermentation.

16. The method according to claim 15, further comprising: partially returning the outflow of a downstream bioreactor from among the two or more bioreactors to an upstream bioreactor and/or to the at least one equalization basin reactor.

17. The method according to claim 1, further comprising: connecting two or more bioreactors in parallel; and
performing the second wastewater treatment in each of the two or more bioreactors;
wherein the performing the second wastewater treatment is independently selected in each of the two or more bioreactors from the group consisting of aerobic treatment, anaerobic treatment, anoxic treatment, and anaerobic fermentation.

18. The method according to claim 1, further comprising: agitating the wastewater in the at least one equalization basin reactor with a floating mixer and/or with a jet manifold mixing system and/or a submersible mixer pump.

19. The method according to claim 1, further comprising: partially returning the outflow of the substantially treated wastewater into the at least one equalization basin reactor.

20. The method according to claim 1, further comprising: returning the activated sludge precipitated in the gravity settling clarifier or the floatation clarifier to the at least one equalization basin reactor and/or the at least one bioreactor.

21. A method for treating wastewater comprising:
providing a mechanical wastewater treatment unit and a plurality of wastewater treatment plant trains;
wherein each train from among the plurality of treatment plant trains comprises at least one equalization basin reactor, at least one bioreactor, and a gravity settling clarifier or a floatation clarifier;
performing a mechanical screening of wastewater in the mechanical wastewater treatment unit;
receiving the wastewater directly from the mechanical wastewater treatment unit in the at least one equalization basin reactor under dry weather conditions with a dry weather peak hourly flow rate and under wet weather conditions with a wet weather peak hourly flow rate;
performing a first wastewater treatment in the at least one equalization basin reactor under the dry weather conditions and under the wet weather conditions to obtain partially treated wastewater;
feeding an outflow of the partially treated wastewater from the at least one equalization basin reactor into the at least one bioreactor;
performing a second wastewater treatment in the at least one bioreactor to obtain substantially treated wastewater;
feeding an outflow of the substantially treated wastewater from the at least one bioreactor into the gravity settling clarifier or the floatation clarifier;
precipitating an activated sludge in the gravity settling clarifier or the floatation clarifier from the substantially treated wastewater to obtain treated water; and
discharging the treated water at a discharge point,
wherein the at least one equalization basin reactor has an inflow surge volume capacity of about 30% to about 300% of an average daily flow volume; and,
wherein a portion of the wastewater received in the at least one equalization basin reactor under wet weather conditions comprises stormwater from infiltration and inflow into an upstream municipal sewer system.

22. The method according to claim 21, further comprising: partially returning the outflow of the bioreactor of a first train from among the plurality of wastewater treatment plant trains to the equalization basin reactor of the first train or of a second train.

23. The method according to claim 21, further comprising: returning the activated sludge precipitated in the clarifier into the at least one equalization basin reactor of the first train or of a second train and/or to the at least one bioreactor of the first train or of the second train.

24. The method according to claim 1 wherein the mechanical wastewater treatment unit is selected from the group consisting of a screening unit and a grit removal unit.

25. The method according to claim 21 wherein the mechanical wastewater treatment unit is selected from the group consisting of a screening unit and a grit removal unit.

* * * * *